July 13, 1965  T. E. HOWLES ETAL  3,194,418
COIL HANDLING APPARATUS
Filed Nov. 19, 1962  7 Sheets-Sheet 1

INVENTORS
THOMAS EDWARD HOWLES
AND BENJAMIN BELL
BY
*Henry C. Westin*
THEIR ATTORNEY

INVENTORS
THOMAS EDWARD HOWELS
AND BENJAMIN BELL
BY
THEIR ATTORNEY

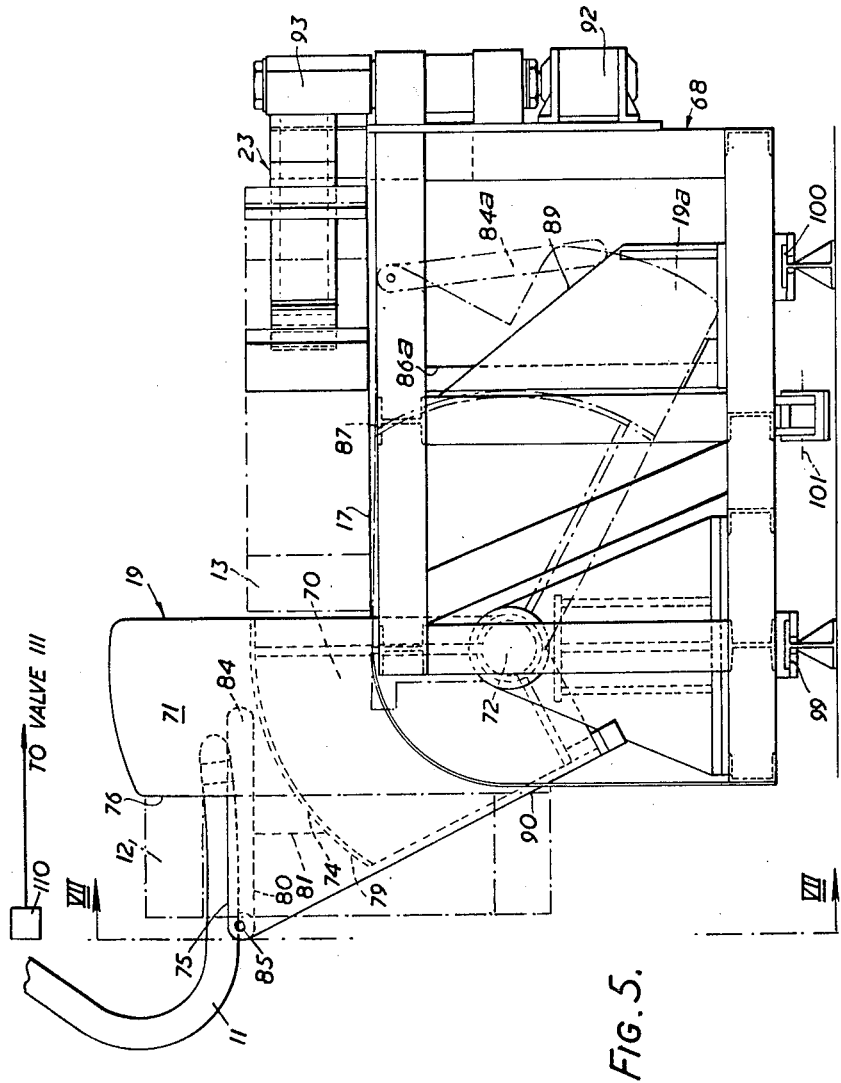

July 13, 1965  T. E. HOWLES ETAL  3,194,418
COIL HANDLING APPARATUS
Filed Nov. 19, 1962  7 Sheets-Sheet 7
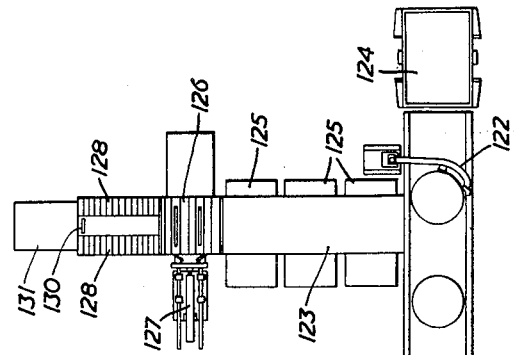
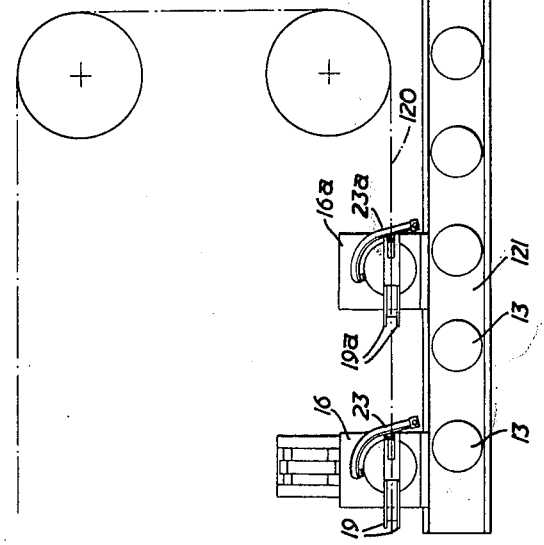
FIG. 10.
INVENTORS
THOMAS EDWARD HOWLES
AND BENJAMIN BELL
BY
Henry C. Westin
THEIR ATTORNEY United States Patent Office 3,194,418
Patented July 13, 1965

3,194,418
COIL HANDLING APPARATUS
Thomas Edward Howles, Bradway Bank, Sheffield, England, and Benjamin Bell, Newcastle, New South Wales, Australia, assignors to Davy and United Engineering Company Limited, Darnall Works, Yorkshire, England, a British company
Filed Nov. 19, 1962, Ser. No. 249,304
11 Claims. (Cl. 214—8)

This invention relates to mechanical handling apparatus and particularly to transfer apparatus for removing articles from a moving conveyor, orienting the articles and feeding them to other apparatus.

The invention is particularly concerned with, although not limited to, a take-off mechanism for removing, from an overhead conveyor, vertically suspended coils of wire, and then laying the coils flat.

In the invention, a take-off mechanism for removing a ring-like element from a carrying member on which the element is suspended and which is arranged to traverse a predetermined path comprises a platform located under that path and having an opening therein, and a pair of arms pivotally mounted together for movement between an operative position projecting above the platform surface and straddling the path of the carrying member, through the opening, to a retracted position below the platform surface, each arm having a first portion which, in the operative position of the arm, projects above the path of the element, a second portion which projects backwardly with respect to the direction of movement of the carrying member and is arranged to be brought within the element on movement of the carrying member and a third portion, which, when the arm is in the operative position, extends downwardly and forwardly from the rear extremity of the second portion, the arrangement being such that on movement of the arms from the operative position to the retracted position the element is engaged by the first and second portions and lifted off the carrying member and the third portion engages and supports the element adjacent its lowermost part so that the element is turned over from a vertical attitude to a horizontal attitude and deposited on the platform in the horizontal attitude.

The ring-like element may be a coil of wire, in which case there may be provided a strapping device to which the coil is swept from the platform and which straps the wire together. There may then be an upender for upending the strapped coil for removal.

Figure 1:
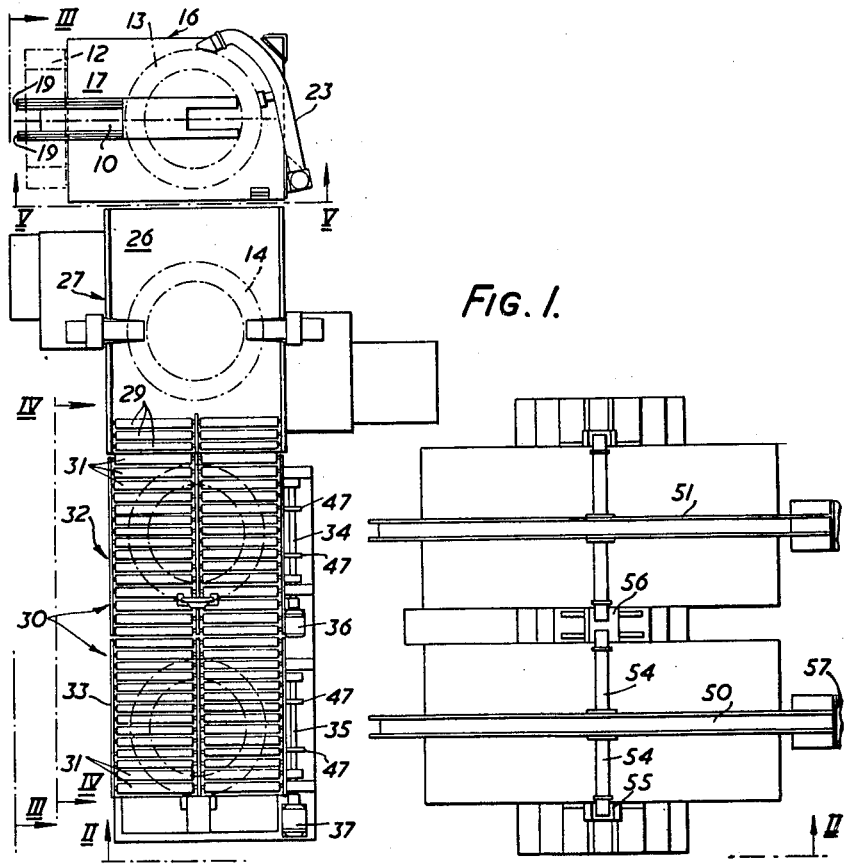
Figure 2:
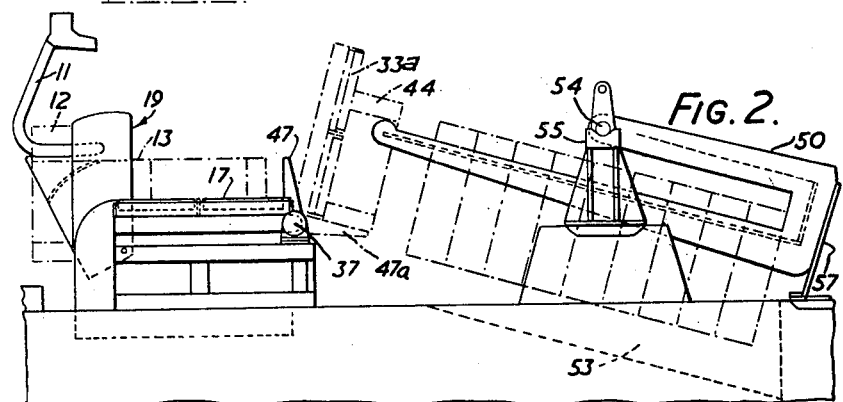
Figure 3:
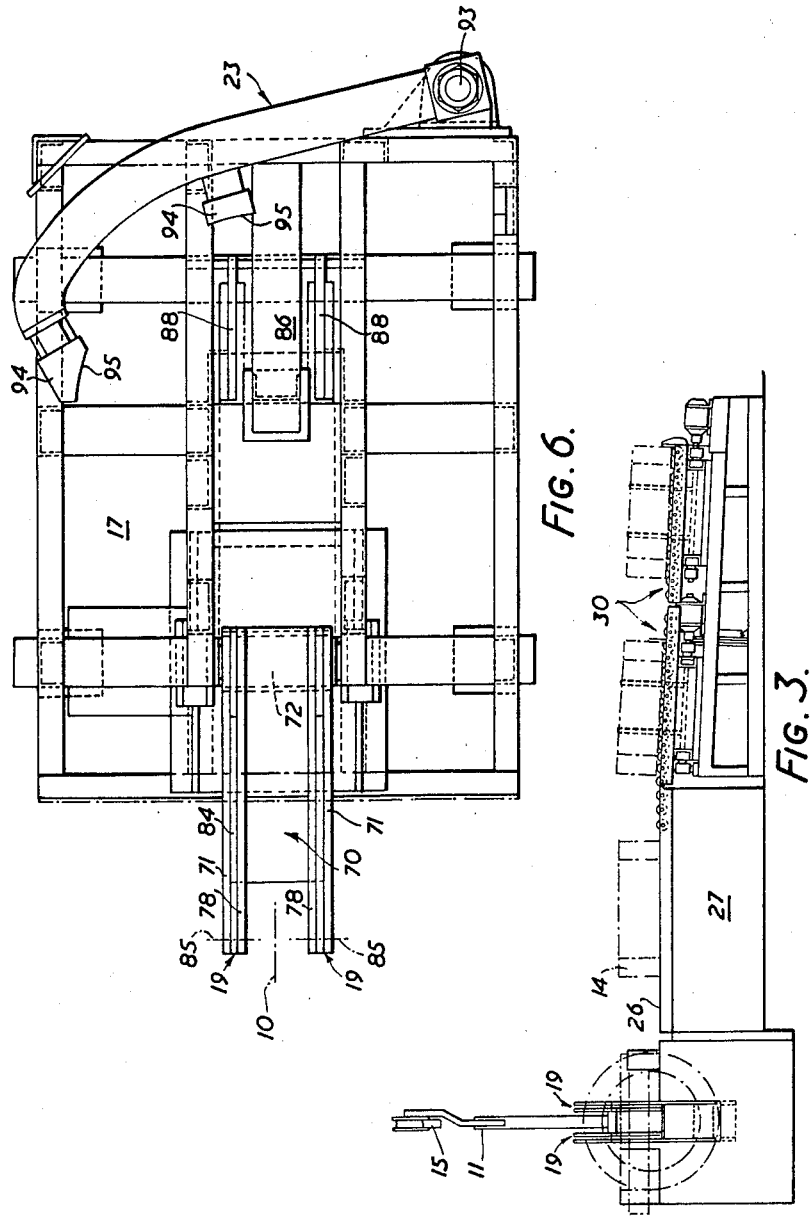
Figure 4:
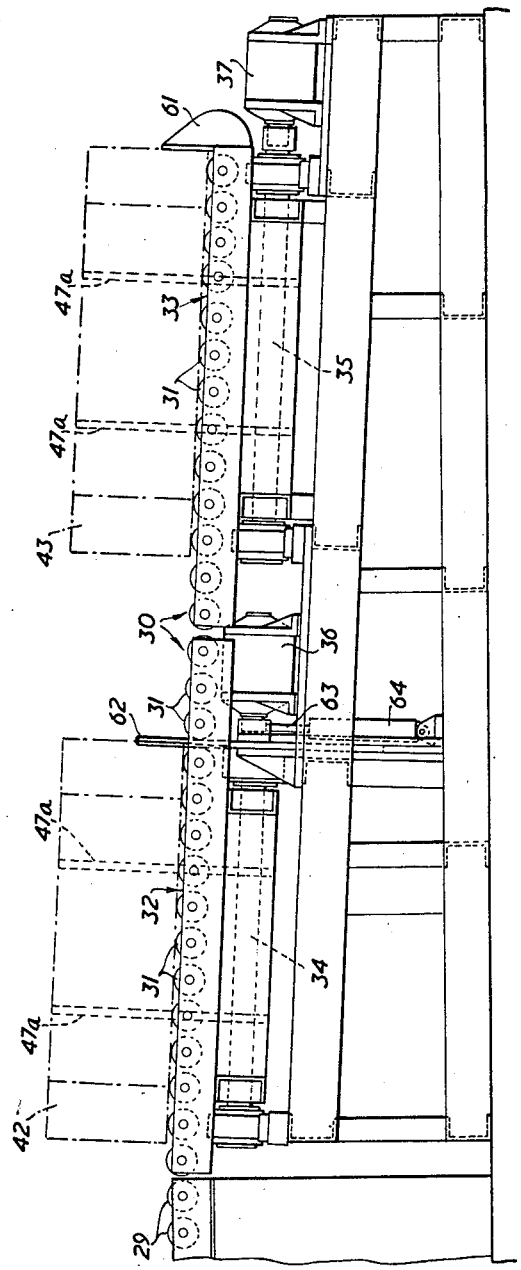
Figure 7:
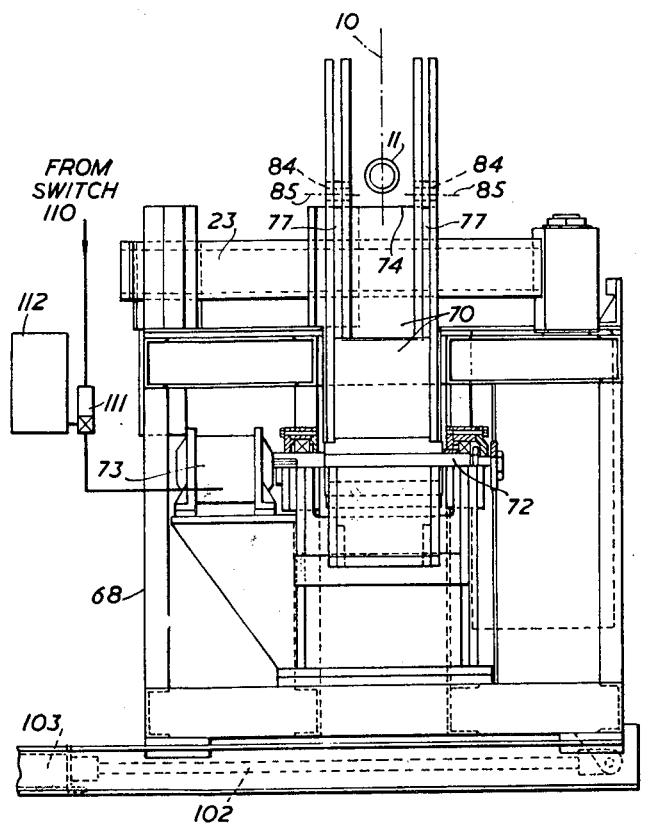
Figure 8:
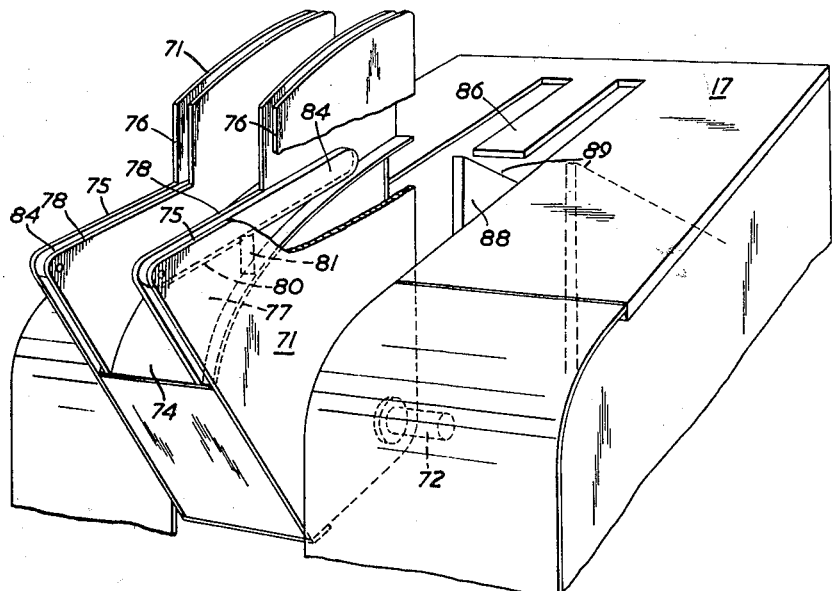
Figure 9:
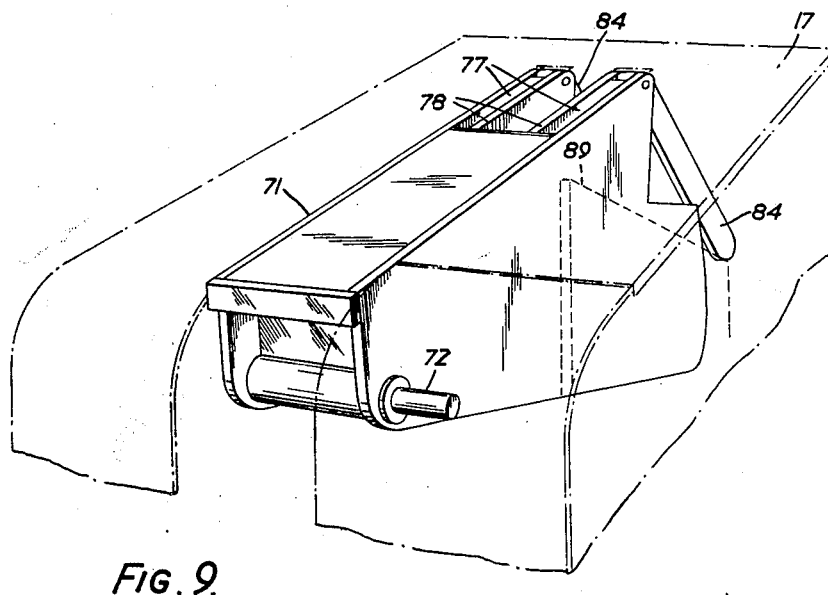

The invention will be more readily understood by way of example from the following description of a take-off mechanism in accordance therewith, reference being made to the accompanying drawings, in which FIGURE 1 is a plan view of the complete handling apparatus incorporating the invention, FIGURE 2 is an end elevation taken along the line II—II of FIGURE 1, FIGURE 3 is a side elevation of the apparatus of FIGURE 1, taken along the line III—III, FIGURE 4 is an enlarged side elevation of the apparatus of FIGURE 1, taken along the line IV—IV, FIGURE 5 is an enlarged side elevation of part of the apparatus of FIGURE 1, taken along the line V—V, FIGURE 6 is a plan view of the apparatus shown in FIGURE 5, FIGURE 7 is a side elevation of the apparatus of FIGURE 5, taken along the line VII—VII, FIGURES 8 and 9 are perspective views showing the arms 19 in elevated and retracted positions respectively, and FIGURE 10 is a plan view of a modification.

Coils of wire are delivered to the apparatus, one by one, by a hook conveyor the centre line of which is shown at 10 in FIGURE 1. The hook conveyor comprises a track 15 (FIGURE 3) or the like along which continuously moves a series of equispaced hooks, such as the hook shown at 11 in FIGURES 2, 3 and 5. Each such hook has a horizontally extending lower portion capable of carrying a vertically hanging coil of wire 12.

The coil take-off unit indicated at 16 in FIGURE 1 and shown in greater detail in FIGURES 5, 6 and 7, is so arranged that, each time a hook 11 carrying a coil 12 approaches the unit 16, the coil is automatically removed from the hook 11 by a coil take-off arm 19 which is then retracted, so that the coil lies flat, as indicated at 13, upon the flat upper surface 17 of the take-off unit 16. A coil sweep-off arm 23 is then automatically operated to push the coil of wire from the position 13 to a position 14 (FIGURES 1, 3) where it lies upon the flat upper surface 26 of a strapping machine 27.

The strapping machine 27 may be of known form, and so arranged that when a coil of wire is placed at 14 upon the surface 26, two or more straps are automatically fastened around the turns of the coils at spaced points around the periphery of the coil.

The coil is then pushed off the surface 26 by means (not shown) forming a part of the strapping machine 27, and is pushed over a number of rollers 29 onto a roller table assembly 30 which is shown in greater detail in FIGURE 4. The rollers 31 of the roller table 30 are not driven, but the assembly 30 is inclined to the horizontal so that coils of wire tend to move down the roller table assembly 30, under gravity.

The roller table assembly 30 is divided into two similar sections 32 and 33, which are arranged in series. Each of the sections 32 and 33 is similarly pivoted about shafts 34 and 35 respectively, these shafts extending along one side of the roller table assembly 30, parallel to the inclined surface of the assembly 30. By rotation of the shafts 34 and 35, respectively by means of rotary cylinders 36 and 37, each of the sections 32 and 33 of the roller table can be rotated to a vertical position and somewhat beyond, for example to the position 33a shown in FIGURE 2.

When either of the sections 32 or 33 is raised to a position such as 33a while the section concerned has a coil of wire resting upon it (as at 42 and 43 of FIGURE 4), this coil is turned to a position 44 (FIGURE 2). The coil is prevented from dropping off the section 32 or 33, concerned, by arms 47 which normally extend vertically upwards but which, when one of the sections 32 and 33 is raised to a position such as 33a, take up a position 47a.

When the section 33 is raised to the position 33a, a coil 44 upon the section slides off the arms 47 and onto the lower limb of a C-hook 50 which is supported in an inclined position above a pit 53 (FIGURE 2) by, firstly, a transverse shaft 54 which rests at its opposite ends upon supports 55 and 56, and by an inclined backplate 57 against which the centre portion of the C-hook 50 rests.

As indicated in FIGURE 2, several coils, for example ten, can be placed in series upon the lower limb of the C-hook 50. The C-hook, when fully loaded, can be raised by means of a crane (not shown), and the coils transferred to storage.

A second C-hook 51 (FIGURE 1) is arranged, similarly to the C-hook 50, to co-operate with the section 32 of the roller table assembly 30.

Two C-hooks 50 and 51 are provided, so that one can be loaded while the other is transporting coils to storage. If the C-hook 50 is being loaded, coils move down the roller table assembly 30 to the section 33 to the position 43 where they are brought to rest by a stop 61 (FIGURE 4). If coils are to be loaded onto the C-hook 51, a stop member 62 (FIGURE 4) is raised by means of a piston 63 and cylinder 64, so as to bring the coils to rest at the position 42.

The coil take-off unit 16 will now be described in greater detail, with reference to FIGURES 5, 6 and 7. The unit 16 comprises a suitable base structure 68 designed to present a flat and horizontal upper surface 17 which is interrupted by the entrance to a cavity which receives the coil take-off arm 19 in the retracted position. The entrance to the cavity is such that, when the coil take-off arm 19 is in the retracted position, the flat upper surface 17 is uninterrupted, so that a coil lying upon the surface 17 can be swept off by the coil sweep-off arm 23, without difficulty.

The coil take-off arm 19 comprises a hollow structure 70 disposed between two side plates 71, and pivoted about a horizontal shaft 72 such that the coil take-off arm 19 can be rotated by operation of the rotary cylinder 73 (FIGURE 7) driven by a liquid from a source 112 of liquid under pressure through a solenoid-operated switch 111. The structure 70 has a curved upper surface 74, this surface being a part-cylindrical surface the axis of symmetry of which is the axis of the shaft 72.

The side plates 71 project beyond the curved surface 74, and are cut away as shown in FIGURE 5 so that each side plate 71 provides, when the coil take-off arm 19 is in its upright position and ready to receive a coil 12 from a hook 11, a supporting surface 75 for the upper part of the coil 12, and two stopping surfaces 76 which act as stops for the upper part of the coil 12.

Suitably secured to the inner side of each of the parts of the side plates 71 which project beyond the curved surface 74, is a further plate 77 and an inner plate 78. Each of the inner plates 78 is of the same shape as the upper part of each of the side plates 71, and rests at its lower end upon the curved surface 74. Each of the plates 77 is relatively small; its base 79 (FIGURE 5) rests upon the curved surface 74 and each plate 77 has, when the coil take-off arm 19 is upright, a horizontal upper surface 80 and a vertical surface 81.

Each of the horizontal surfaces 80 lies somewhat below the supporting surfaces 75, so as to permit a push-off arm 84 to be pivoted, about an axis 85, between each side plate 71 and the corresponding inner plate 78. Thus, when the coil take-off arm 19 is in its upright position (FIGURE 5) each of the push-off arms 84 extends horizontally, its lower surface lying upon the upper surface 80 of the corresponding plate 77, and its upper surface being arranged to be flush with the adjacent supporting surfaces 75 and also with the similar upper surface of the adjacent inner plate 78.

The cavity, within the base structure 68, which receives the coil take-off arm 19 in its retracted position is in the form of a rectangular parallelepiped, except for a centrally located projection 86 (FIGURE 6) which projects above the cavity at the end remote from the shaft 72. The projection 86 is supported by a vertical strut 86a (FIGURE 5). The end face 87 (FIGURE 5) of the projection 86 is curved, having an axis of symmetry the axis of the shaft 72, and is of slightly greater radius than the curved surface 74 of the structure 70. Centrally located within each of the cavity portions at the sides of the projection 86, is a cam plate 88 having an inclined upper cam surface 89.

The operation of the coil take-off arm 19 is as follows. Assuming that a hook 11 of the hook conveyor, carrying a coil 12, approaches the coil take-off arm 19 while that arm is in its upright position, when the coil 12 reaches the position where it touches the stopping surfaces 76, the hook 11 engages and actuates a micro-switch shown diagrammatically at 110. When switch 110 is actuated, the valve 111 is operated to permit liquid under pressure to pass to, and energise, the rotary cylinder 73 to rotate the coil take-off arm 19 to its retracted position 19a (FIGURE 5). As the arm 19 rotates, the supporting surfaces 75 rise to engage with the underside of the upper part of the coil 12; further rotation of the arm 19 lifts the coil 12 off the lower limb of the hook 11, which continues to move continuously over the unit 16. As the arm 19 continues to rotate, the upper portions of the coil 12 rest upon the surfaces 75 and 76, and lower portions of the coil 12 engage the lower part of the arm 19 in the region 90 (FIGURE 5). The coil 12 is thus borne away from the moving hook 11 and is rotated towards a position 13 where it rests upon the flat upper surface of the coil take-off unit 16.

As the coil take-off arm 19 moves into its retracted position, the ends of the push-off arms 84 engage the inclined upper cam surfaces 89 of the cam plates 88 such that the push-off arms 84 move forwards towards the positions 84a (FIGURE 5). As the arms 84 move forwards to the positions 84a, they push the upper portions of the coil 12 away from the surfaces 75 and 76, so preventing the upper portions of the coil 12 from becoming caught between the surfaces 75 and the flat upper surface 17 of the unit 16.

In an alternative arrangement, the switch 110 may be provided upon the coil take-off arm 19, the switch being so arranged that as a coil 12 upon a hook 11 approaches the arm 19 and touches this arm, the switch 110 is actuated to operate valve 111 and hence the rotary cylinder 73. An advantage of this alternative arrangement is that when a hook 11 not carrying a coil 12 approaches the take-off arm 19, the rotary cylinder 73 would not be operated; the take-off arm 19 would therefore remain stationary, and the hook 11 would pass above the curved surface 74, between the projecting side portions of the take-off arm 19, as may be seen from FIGURE 7.

When the arm 19 is completely retracted, so that the coil lies at the position 13 upon the flat, and now uninterrupted, upper surface 17 of the unit 16, a second suitable actuating mechanism (not shown) is operated to energise a second rotary cylinder 92 (FIGURE 5) to cause rotation of a vertical shaft 93 upon which one end of the coil sweep-off arm 23 is mounted. The arm 23 is curved as shown in FIGURE 6, and carries a pair of stops 94, the stop surfaces 95 of which are curved, with a common radius of curvature equal to the radius of the coils 12 such that, upon actuation of the cylinder 92, the sweep-off arm 23 swings round such that the surfaces 95 engage the coil in the position 13, and sweep it off the surface 17 onto the adjacent flat upper surface 26 of the strapping machine 27.

The actuating mechanism for the second rotary cylinder 92 may be of any suitable form. For example, a limit switch may be arranged to be actuated when the take-off arm 19 reaches its retracted position 19a, so that the cylinder 92 is actuated upon operation of this limit switch, immediately the coil 12 reaches the position 13.

As soon as the coil has been swept off the surface 17, the motor 73 is actuated to return the take-off arm 19 to its upright position, ready to receive the next coil, and the cylinder 92 is operated to return the sweep-arm 23 to the position shown in FIGURE 6. Preferably the motor 73 is operated before the cylinder 92 to return the take-off arm 19 to its upright position before the sweep-off arm 23 is returned to its normal position; the take-off arm 19 will then be ready to receive a further coil 12 earlier than would be the case if the sweep-off arm 23 were first returned to its normal position.

The coil take-off unit 16 is mounted upon slides 99 and 100 (FIGURE 5), and the base structure 68 of the unit 16 is pivotally connected at 101 to the piston rod 102 of a piston-and-cylinder arrangement 103 by operation of which the coil take-off unit 16 can be withdrawn from its normal position, as indicated in FIGURE 1, so as to permit substitution of a second similar unit 16, in the event of the first unit 16 failing to operate correctly.

In the modification shown in FIGURE 10 two take-off units are provided so that, in the event of failure of one, production is not held up. In FIGURE 10, the two take-off units are shown at 16, 16A, the take-off arms 19, 19A being arranged successively along the line of travel 120 of the hooks. Each unit 16, 16A has its sweep-off arm 23, 23A arranged to sweep coils 13 removed from the hooks on to a conveyor 121 arranged parallel to that part of the line of travel 120 through the take-off units.

The conveyor 121 carries the coils away from the take-off units and located at the end distant from those units is a further sweep-off arm 122, which when actuated sweeps coils off conveyor 121 on to a roller conveyor 123. Arm 122 can be raised, as required, to permit unsatisfactory coils to pass under it to a skip 124 and thus be removed from the system.

Spaced along conveyor 123 are three strapping machines 125 any of which can be used to strap the coils swept on the conveyor 123 by arm 122. After being strapped the coils move to a weighing machine 126. Underweight coils are removed to the side by operation of a pusher 127, while the remainder pass on to an inclined twin roller conveyor 128 having a disappearing stop 130. When the stop is lowered, the coil previously held by it on the conveyor 128 passes on to an upender 131 which may be similar to the upender 30 and which upends the coil for removal by a C-hook as described or other convenient means.

In normal operation of the system of FIGURE 10, the unit 16A is not in use, the hooks moving empty over unit 16A from unit 16. However, if unit 16 should fail, it can be withdrawn upon its slides 99, 100 (FIGURE 5) and unit 16A brought into operation without holding up the production line.

It will be appreciated that the invention is not limited to coils of wire, but may be employed for coils of other material and ring-like elements generally.

In accordance with the provisions of the patent statutes, we have explained the principle and operation of our invention and have illustrated and described what we consider to represent the best embodiment thereof. However, we desire to have it understood that within the scope of the appended claims, the invention may be practiced otherwise than as specifically illustrated and described.

We claim:

1. A take-off mechanism for removing a ring-like element from a carrying member on which the element is suspended and which is arranged to traverse a predetermined path, comprising a platform located under said path and having an opening therein, and a pair of arms pivotally mounted together for movement between an operative position, in which said arms project above said platform and straddle said path, through said opening to a retracted position below the platform surface, each arm having a first portion which, in said operative position of the arm, projects above said path, a second portion which projects backwardly with respect to the direction of movement of said carrying member and is arranged to be brought within the element on movement of said carrying member, and a third portion, which, when the arm is in said operative position, extends downwardly and forwardly from the rear extremity of said second portion, the arrangement being such that, on movement of said arms from said operative to said retracted position, the element is engaged, and lifted off said carrying member by said first and second portions and said third portion engages and supports the element adjacent its lowermost part so that the element is turned from a vertical attitude to a horizontal attitude and deposited on said platform in the horizontal attitude.

2. A take-off mechanism according to claim 1 in which the two arms are joined together by a member having a curved surface located below the level of the second portion of the arms.

3. A take-off mechanism according to claim 1 in which a push-off member is pivoted to one of the arms so as to prevent the element from becoming trapped between the arms and the platform as the arms swing into the retracted position.

4. A take-off mechanism according to claim 1 in which there is a sweep-off arm arranged slightly above the surface of the platform and mounted to swing over the platform surface and to sweep off an element lying thereon.

5. A take-off mechanism for coils according to claim 4 in which there is a coil strapping device to which the coil is conveyed from the platform.

6. A take-off mechanism for coils according to claim 5 in which the strapping device is located adjacent the platform, coils being swept on to the strapping device by the sweep-off arm.

7. A take-off mechanism for coils according to claim 5 in which there is a conveyor between the platform and the strapping device, the coils being swept on to the conveyor by the sweep-off arm.

8. A take-off mechanism for coils according to claim 5 in which there is an upender arranged to receive coils from the strapping device and to up-end the coils prior to removal.

9. A take-off mechanism for coils according to claim 8 in which the up-ender comprises a table for receiving the coils, the table being tiltable about an approximately horizontal axis to bring the coils into an upstanding disposition.

10. A take-off mechanism according to claim 7 including a second platform and co-operating arm or pair of arms arranged with the first platform in succession along the path of the carrying member and adapted also to supply coils to the conveyor.

11. A take-off mechanism according to claim 1 including power means for turning the arm or arms from the operative position to the retracted position, and means operated by an element or coil on arrival adjacent the arm or arms for initiating actuation of the power means.

References Cited by the Examiner
UNITED STATES PATENTS 2,700,332    1/55   Donald _____ 100—2
2,813,643   11/57   Prentice _____ 214—89
2,926,598    3/60   Dentzer _____ 100—3
3,027,021    3/62   Kramer.

HUGO O. SCHULZ, Primary Examiner.

MORRIS TEMIN, Examiner.